United States Patent
Roy et al.

(10) Patent No.: US 10,447,002 B2
(45) Date of Patent: Oct. 15, 2019

(54) MONOMODE OPTICAL FIBER DESIGNED TO COMPENSATE FOR A REFRACTIVE INDEX VARIATION RELATED TO THERMAL EFFECTS AND LASER USING SUCH AN OPTICAL FIBER AS A GAIN MEDIUM

(71) Applicants: Universite de Limoges, Limoges (FR); Centre National de La Recherche Scientifique, Paris (FR)

(72) Inventors: Philippe Roy, Limoges (FR); Romain Dauliat, Limoges (FR); Raphael Emmanuel Jamier, Limoges (FR)

(73) Assignees: Universite de Limoges, Limoges (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 15/568,876

(22) PCT Filed: Apr. 22, 2016

(86) PCT No.: PCT/FR2016/050960
§ 371 (c)(1),
(2) Date: Oct. 24, 2017

(87) PCT Pub. No.: WO2016/170287
PCT Pub. Date: Oct. 27, 2016

(65) Prior Publication Data
US 2018/0115134 A1    Apr. 26, 2018

(30) Foreign Application Priority Data
Apr. 24, 2015  (FR) ...................... 15 53710

(51) Int. Cl.
*H01S 3/067* (2006.01)
*H01S 3/102* (2006.01)

(52) U.S. Cl.
CPC ...... *H01S 3/06733* (2013.01); *H01S 3/06729* (2013.01); *H01S 3/06737* (2013.01); *H01S 3/1028* (2013.01)

(58) Field of Classification Search
CPC ............. H01S 3/06733; H01S 3/06737; H01S 3/1028; H01S 3/06729
See application file for complete search history.

(56) References Cited

U.S. PATENT DOCUMENTS

| 7,400,807 B2* | 7/2008 | Minelly ............. G02B 6/03605 |
| | | 359/341.1 |
| 9,001,414 B2* | 4/2015 | Mattsson ............ H01S 3/06754 |
| | | 359/341.3 |

(Continued)

FOREIGN PATENT DOCUMENTS

| FR | 2974637 | 11/2012 | |
| JP | 200075140 A | * 3/2000 | ............... G02B 6/00 |

OTHER PUBLICATIONS

International Search Report, dated Jul. 13, 2016, priority document.

(Continued)

*Primary Examiner* — Yuanda Zhang
(74) *Attorney, Agent, or Firm* — Greer, Burns & Crain, Ltd.

(57) ABSTRACT

A monomode optical fiber, and a process for manufacturing such a fiber, that comprises a monomode core and at least one cladding encircling the core. The monomode core comprises at least two zones, a first zone with at least one first refractive index and a second zone with at least one second refractive index different from the first refractive index. The difference between the first refractive index and the second refractive index is of the same order of magnitude as the variation in the refractive index of the second zone between the inactive state and the active state of the fiber.

14 Claims, 6 Drawing Sheets

(56) References Cited

U.S. PATENT DOCUMENTS

| | | | |
|---|---|---|---|
| 9,256,025 B2* | 2/2016 | Roy | G02B 6/02361 |
| 2007/0206912 A1 | 9/2007 | Minelly et al. | |
| 2011/0228382 A1 | 9/2011 | Mattsson et al. | |
| 2014/0193127 A1 | 7/2014 | Roy et al. | |

OTHER PUBLICATIONS

"High-Power very large mode-area thulium-doped fiber laser" Florian et al., Nov. 1, 2012.
"The influence of index-depressions in core-pumped Yb-doped large pitch fibers" Florian et al., Dec. 7, 2010.
"Thermally induced waveguide changes in active fibers", Florian et al., Feb. 13, 2012.
"Thermal effect-resilient design of large mode area double-cladding Tb-doped photonic crystal fibers" Enrico et al., Feb. 26, 2013.
"Large mode area aperiodic fiber designs for robust singlemode EMI ion under high thermal load", Dauliat et al., Apr. 15, 2015.
"High-power thermally guiding index-antiguiding-core fibers" Florian et al., Feb. 15, 2013.

* cited by examiner

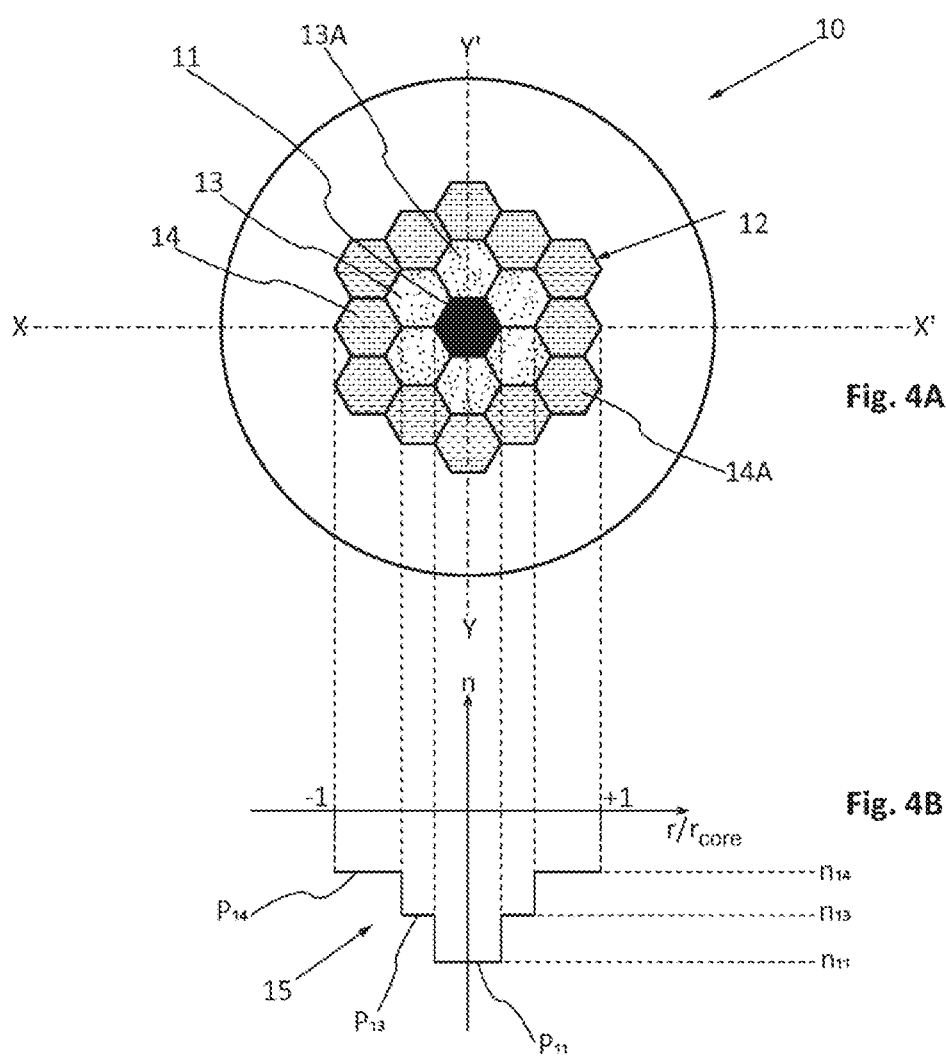

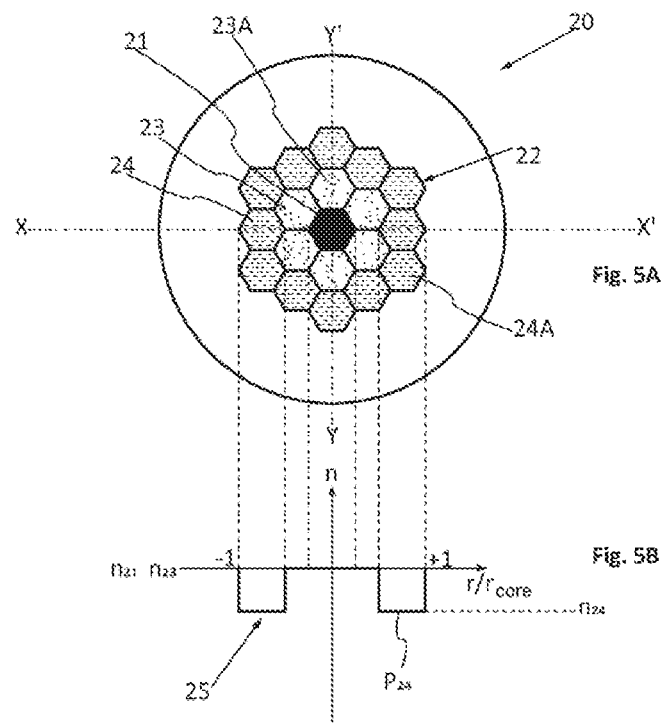
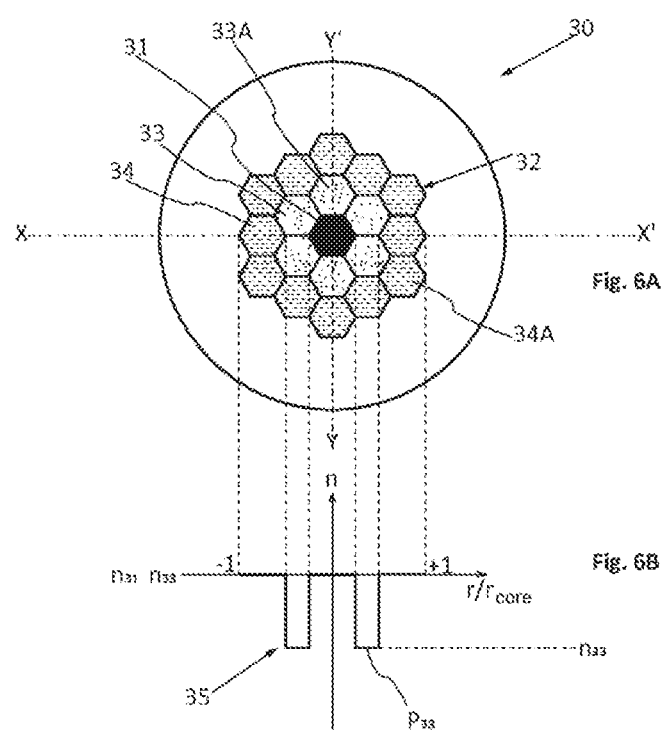

MONOMODE OPTICAL FIBER DESIGNED TO COMPENSATE FOR A REFRACTIVE INDEX VARIATION RELATED TO THERMAL EFFECTS AND LASER USING SUCH AN OPTICAL FIBER AS A GAIN MEDIUM

CROSS-REFERENCES TO RELATED APPLICATIONS

This application claims the benefit of the French patent application No. 1553710 filed on Apr. 24, 2015, the entire disclosures of which are incorporated herein by way of reference.

BACKGROUND OF THE INVENTION

The subject of the present invention is a single-mode optical fiber designed to compensate for a variation in refractive index linked to thermal effects. Such an optical fiber is particularly, but not exclusively, suitable for use as a transport and amplification medium in a high-power optical fiber laser.

The term "optical fiber laser" covers any application in which the capacity of the fiber to emit light by means of electron de-excitation of elements that have previously been placed in an excited electronic state is employed. Hence this relates both to lasers and, more generally, to optical amplifiers. The optical fiber of the invention may be used in pulsed or continuous lasers.

The success of optical fiber lasers owes itself to their numerous properties: they combine high optical efficiency, a high capacity for heat dissipation, a high integration potential and excellent beam quality.

In a known manner, in an optical fiber laser, the optical fiber is used as an active medium when it is doped with rare-earth ions (erbium, ytterbium, thulium, holmium, neodymium and so on). In this case, the resonant cavity consists of the doped fiber placed between two mirrors or looped back on itself.

For power lasers, according to a first known embodiment, the structure of the fiber is composed of a single-mode core (for example made of silicon doped with rare-earth ions) and a multimode pumping cladding (for example made of doped or undoped silicon) that is larger in size than the core, thereby allowing the propagation of the various modes of a multimode pump. According to this configuration, the pump wave is guided inside the multimode cladding of the fiber while the laser wave is generated then guided solely inside the single-mode core. The laser beam thus generated is a single-mode beam that exhibits all of the desired properties of spatial and temporal coherence along with substantial power due to the multimode pumping.

Triple-clad single-mode optical fibers are also known, which allow the efficacy of amplification to be improved while retaining the single-mode character of the core. Patent FR2 974 637 thus describes an optical fiber comprising, from the center to the periphery:
 a single-mode core that is at least partially doped with a rare earth;
 an optically inactive intermediate cladding, the effective refractive index of which differs from the refractive index of the core by at most $1\times10^{-3}$;
 a multimode pumping cladding; and
 an outer cladding.

By controlling the profile of the refractive index in the intermediate cladding, it is possible to provide a small difference in refractive index between the core and the intermediate cladding while having a core with a large diameter and high doping content. The fiber thus formed therefore provides both improved amplification while retaining the single-mode character.

The term "single-mode beam" is understood to mean a beam having a divergence that is close to the minimum dictated by the diffraction of the intensity profile of the beam.

However, in all of these optical fiber structures, access to high power levels is limited due to its very low active volume and to the high level of confinement of light energy within the core, the diameter of which is between a few microns and a few tens of microns. High power densities favor the appearance of non-linear effects, which negatively affect the quality of the laser beam emitted.

In order to overcome the problems linked to non-linear effects, the most useful solution proposed in recent years has consisted in developing micro-structured fibers that allow the effective area of the core of the fiber to be increased while retaining the single-mode character of the output beam.

According to one embodiment, the micro-structured fibers take the form of a periodic or aperiodic arrangement with inclusions having a low index or high index surrounding a defect that serves as the core. Thus, it is possible to modulate the effective index of the cladding by adjusting the spacing of the array and the diameter of the inclusions. The wave is guided solely inside the core by means of a modified total reflection mechanism or by means of a photonic band gap guiding mechanism.

In order to decrease non-linear effects, it is therefore necessary to increase the area of the mode while remaining single mode. To this end, it is necessary to decrease a difference in index $\Delta n = n_{core} - n_{cladding}$ between the core and the cladding in order to provide the single-mode character. Control of this difference in index of the order $1\times10^{-4}$ has thus been made possible by modulating the effective index of the micro-structured cladding.

However, the dramatic increase in the size of the core can only take place while also providing the most precise control possible of the difference in index $\Delta n = n_{core} - n_{cladding}$ between the index of the core of the fiber and the index of the intermediate cladding. Thus, in the case of wide-core or LMA (large-mode-area) fibers, the parameter $\Delta n$ becomes an essential parameter for providing both the wave-guiding phenomenon and the single-mode character of the laser beam emitted at the output of the optical fiber.

However, the quantum defect, arising from the laser effect, leads to heating of the material which may, at very high power, cause a change in the refractive index of the materials and negatively affect the guiding properties of the optical fiber. Specifically, the refractive index increases with temperature. Thus, at high power, the amplification phenomenon can lead to an index increase in the cross section of the optical fiber of the order of $10^{-5}$ to several $10^{-4}$. This value may seem low when it is considered that the propagation of the wave inside a standard fiber exhibits a (core–cladding) index jump of the order of several $1\times10^{-3}$. However, in the case of single-mode large-mode-area microstructured fibers, the difference in index between the core and the cladding may be smaller than $1.10^{-4}$. In these structures, the variations in index caused by heating of the material may then affect the spatial quality of the beam emitted, such as a decrease in the mode field diameter and mode instabilities.

FIG. 1A schematically shows an index profile 5 of a standard optical fiber with an index jump that is not subject to any external interference. Such an optical fiber is referred to as a "cold optical fiber," corresponding to an inactive state of the optical fiber. For optical fibers, the index profile corresponds to the refractive index distribution of the fiber as a function of the radius of the optical fiber. In the conventional manner, the variable r (from coordinates r, θ), normalized with respect to the radius of the core, is shown on the abscissae, and the difference between the refractive index of the core and the refractive index of the fiber cladding is shown on the ordinates. The abscissa r=0 represents the center of the optical fiber. The core of the fiber, having an index ncore, extends from the center to r/rcore=±1. Δn represents the difference in index between the refractive index of the core of the fiber and that of the optical cladding. According to FIG. 1A, the index of the core of the optical fiber has a substantially constant/uniform value in the shape of a step.

According to one embodiment, it is possible not to actively dope the entire area of the fiber core. The core then consists of a central actively doped zone surrounded by a ring-shaped peripheral zone having the same refractive index as the central zone but being passively doped or undoped. It is possible to envisage other forms of dopant distribution in the core.

In FIG. 1B, 6 schematically shows the profile of a temperature gradient appearing in the core of an optical fiber when it is in an active state.

The term "active state" is understood to mean a state in which the optical fiber is currently being used to amplify a light wave. In the active state of the optical fiber, the pumping function is active and the optical fiber is subject to an increase in temperature due to thermal loading, whereas in the inactive state of the optical fiber the pumping function is not active and the optical fiber is not subject to an increase in temperature due to thermal loading. It can be seen that the temperature maximum is located in the center of the core of the optical fiber. The temperature decreases quadratically in the actively doped core with increasing distance from its center.

In FIG. 1C, 7 schematically shows an index profile of an optical fiber in an active state. It no longer takes the shape of a step. Specifically, although the difference in index at the active core/cladding interface remains unchanged, the overall profile is subject to a gradient-type progression. This modification of the index profile in the core and the cladding is caused by thermal effects that are proportional to the optical power density in the core. Typically, an index gradient of $5.10^{-5}$ can be observed on a core of 50 μm in diameter for the absorption of 75 W/m of pump power.

FIG. 2A schematically shows the index profile of an optical fiber in an inactive state and the effective indices ne01, ne11 of the two first guided modes inside the core. Only the effective index ne01 of the first mode is included between the index of the core ncore and the index of the cladding ncladding. As such, only the first mode is allowed to propagate inside the core of the fiber. Since the effective index ne11 of the second mode is not included between the index of the core and that of the cladding, the second mode is therefore not allowed to propagate inside the core. The effective index may be likened to the refractive index from the point of view of the light propagating along one mode inside the structure of the core.

In FIG. 2A, 8 shows the near-field intensity distribution of the fundamental mode as output from the optical fiber. It is observed that the beam emitted as output from such an optical fiber is single mode.

In FIG. 2B, the index profile of an optical fiber in an active state is shown. The effective index of the second mode ne11 is now included between the index of the core and the index of the cladding and is thus confined within the core. Thus, the second mode can be propagated inside the core. In FIG. 2B, 9 shows its near-field intensity distribution as output from the optical fiber. It is observed that the beam emitted as output is multimode, thereby confirming the negative effect on the spectral quality of the beam due to thermal effects.

Thus, even though the new microstructured optical fiber architectures allow the thresholds at which non-linear effects occur to be pushed back, there is still currently no technical solution to the problem of controlling the index profile of the optical fiber, due to the thermal effects that appear in fibers operating at substantial power ranges.

SUMMARY OF THE INVENTION

The invention proposes a single-mode optical fiber with an index profile that is designed to pre-compensate for variations in refractive index when the optical fiber is operating at high optical power ranges. The solution of the invention thus makes it possible to provide better control of the mode characteristics of optical fibers.

To this end, the invention relates to a single-mode optical fiber comprising, from its center to its periphery:
  a single-mode core;
  at least one layer of cladding surrounding the core having at least one cladding refractive index,
  the optical fiber being configured to occupy an inactive state in which the optical fiber is not subject to a thermal load and an active state in which the optical fiber is subject to a thermal load.

According to the invention, the single-mode optical fiber is characterized in that the single-mode core comprises at least two zones, a first zone with at least a first refractive index and a second zone with at least a second refractive index that is different from the first refractive index, the difference between the first refractive index and the second refractive index being of the same order of magnitude as a variation in the second refractive index of the second zone, the variation being caused by a thermal effect between the inactive state and the active state of the fiber.

More specifically, with respect to the fibers of the prior art, the invention proposes replacing the constant value of the refractive index in the single-mode core of the fiber with a plurality of discrete values of the negative index in anticipation of a variation in refractive index due to thermal effects in this region. Thus, by virtue of the present invention, this variation in refractive index in a region of the fiber when the fiber is in an active state is pre-compensated for by the negative index profile when the optical fiber is in an inactive state. In fact, when the optical fiber is in an active state, operating in amplifier or laser configuration, the modifications caused by thermal effects on the index profile of the optical fiber are pre-compensated for and the overall index profile of the core allows a single-mode beam to be maintained up to higher power levels than for the prior art.

In various possible embodiments, the present invention also relates to features which will become apparent over the course of the following description and which should be considered in isolation or in any of their technically possible combinations:
  the second refractive index is lower than the first refractive index;

the difference between the first refractive index and the second refractive index is smaller than 1×10−3 in the inactive state of the optical fiber;

the first refractive index is lower than or equal to the cladding refractive index in the inactive state of the optical fiber;

the second zone extends continuously around the entire perimeter of the single-mode core;

the single-mode core comprises multiple disjunct second zones;

the disjunct second zones are distributed asymmetrically;

the one or more second zones are adjacent to the cladding;

the difference Δn between the refractive index of the one or more second zones of the single-mode core when the optical fiber is in an active state and the refractive index of the cladding surrounding the core is of the order of 10−4;

the single-mode core comprises a ratio between the area of the cross section of the first zone and the area of the cross section of the second zone that is greater than 1, and preferably greater than 2;

the first zone comprises multiple sectors with different refractive indices that are different from the second refractive index of the second zone, the sectors of the first zone each having a constant refractive index and being arranged concentrically, their refractive indices increasing from the center toward the periphery of the single-mode core.

Preferably, the diameter of the core is between 35 μm and 200 μm.

The present invention also relates to a high-power optical fiber laser comprising a single-mode optical fiber such as defined above in the capacity of an optical amplification medium so as to generate a single-mode high-power laser beam.

Another subject of the invention is a method for manufacturing a single-mode optical fiber in accordance with the invention.

BRIEF DESCRIPTION OF THE DRAWINGS

Other features and advantages of the invention will become apparent from the following description of particular embodiments of the invention provided by way of non-limiting examples with reference to the appended drawings, in which:

FIG. 4A and FIG. 4B illustrate a cross-sectional view of an optical fiber including a core composed of an assembly of longitudinal elements forming three concentric layers according to a first embodiment of the invention and a corresponding index profile including three negative index stages according to one embodiment of the invention, respectively;

FIG. 5A and FIG. 5B illustrate a cross-sectional view of an optical fiber akin to that of FIG. 4A and a corresponding index profile including a buried negative index stage, respectively;

FIG. 6A and FIG. 6B illustrate a cross-sectional view of an optical fiber akin to that of FIG. 4A and a corresponding index profile including a buried negative index stage, respectively;

DETAILED DESCRIPTION OF THE PREFERRED EMBODIMENTS

A single-mode optical fiber 10 provided to emit light radiation at a given wavelength comprises, from its center to its periphery, a single-mode core that may or may not be at least partially doped with rare-earth ions and at least one layer of cladding surrounding the core. A cross section through a plane (X-X'; Y-Y') of such a fiber is shown in FIG. 4A.

According to a known embodiment, such as described in document FR2 974 637, the fiber comprises a first layer of cladding surrounding the core, which cladding is optically inactive but contributes to providing the core with its single-mode character, a second layer of pumping cladding and an outer layer of cladding.

The core of the single-mode optical fiber corresponds to the region of the optical fiber where the laser wave is generated and propagated.

Figure 1A:
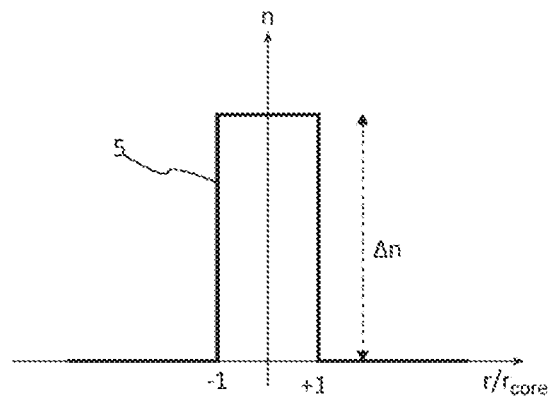
FIG. 1A is a schematic representation of an index profile of the core of an optical fiber in an inactive state according to the prior art, Δn representing the difference in index between the refractive index of the core of the fiber and that of the first layer of optical cladding surrounding the core.
Figure 1B:
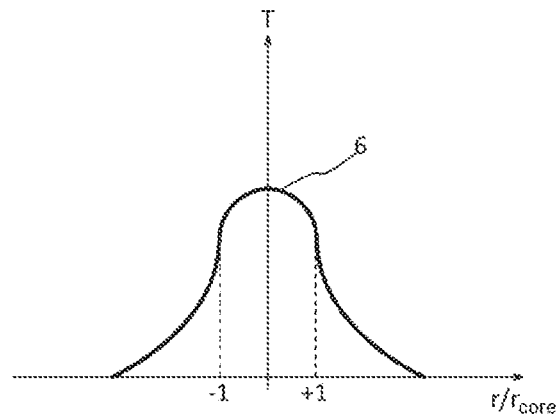
FIG. 1B is a schematic representation of a temperature gradient appearing in the core of an optical fiber in an active state.

When this optical fiber is placed in an active state, the index profile of certain regions of the optical fiber is modified by a thermal effect. By way of example, when the optical fiber is in an active state, what is essentially seen to appear is a temperature gradient that extends from the center of the optical fiber to the outer interface of the fiber to allow heat exchange with the surrounding medium (FIG. 1B). This temperature gradient leads to a modification in the index profile of the optical fiber which may affect the single-mode character of the beam emitted.

The term "optical fiber in an inactive state" is understood to mean an optical fiber that is not in an operating state and the index profile of which is not subject to external interference, such as heating in the core of the fiber. In the inactive state, the optical fiber (more particularly its core) is not subject to an increase in temperature due to thermal loading. Throughout the rest of the description, such an optical fiber is referred to by the term "cold optical fiber."

The term "optical fiber in an active state" is understood to mean an optical fiber that is currently being used to amplify a light wave. In the active state, the optical fiber (more particularly its core) is subject to an increase in temperature due to thermal loading. Throughout the rest of the description, such an optical fiber is referred to by the term "hot optical fiber."

According to one embodiment of the invention, it is proposed to configure the single-mode core of the optical fiber such that it has an index profile comprising at least one negative index stage when it is in an inactive state that is determined so as to pre-compensate for variations in refractive index caused by a temperature gradient appearing in this region of the optical fiber.

The term "index stage" is understood to mean a portion of the index profile that has a constant value.

Thus, the index profile of the core of the fiber comprises a plurality of negative index stages so as to be able to compensate more precisely for variations in refractive index caused by a thermal load in the optical fiber. The constant value of the index in the core of the optical fiber that is affected by thermal effects is replaced by at least two negative refractive index values. The increase in the number of discrete values of the index in the core makes it possible to better control the index profile of the fiber as a function of variations in refractive index caused by a thermal load.

According to one embodiment, only the core of the optical fiber is concerned.

According to another embodiment, the core and a portion of the first layer of cladding surrounding the core are concerned.

According to a first embodiment of the invention, the index profile of the core comprises a plurality of negative index stages that increase from the center of the core to the periphery of the core. This plurality of negative index stages defines a negative gradient index profile. This negative gradient index profile is determined so as to compensate for variations in refractive index caused by a temperature gradient appearing in this region of the optical fiber when the optical fiber is in an active state. In fact, this negative gradient index profile is determined for a target optical power corresponding to a given temperature gradient.

Figure 3A:
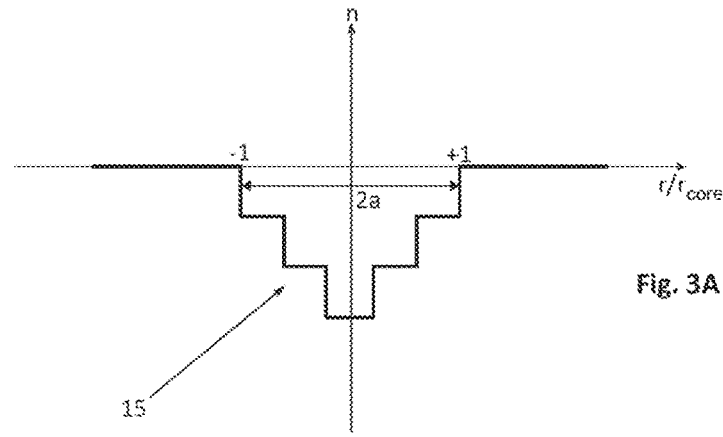
FIG. 3A is a schematic representation of a profile with a negative radial gradient index of a cold optical fiber.

FIG. 3A shows an example of a negative gradient index profile 15 when the optical fiber is in an inactive state. This profile includes three negative index stages. The region concerns only the core and the refractive index increases from the center of the core to the periphery of the core. As illustrated in FIG. 4B, each of the three stages corresponds to a zone of the core having a constant negative refractive index. Each of the portions has a constant negative index that increases from the core of the fiber to the periphery of the core. Thus, the core includes a central portion having a negative index n11, a first ring-shaped portion with a negative index n13 that is higher than n11 and a third ring-shaped portion with a negative index n14 that is higher than n13. Of course, it is possible to increase the number of negative index stages or to give rise to additional stages within a ring-shaped portion in order to better adjust the index profile of the fiber as a function of index variations.

Figure 3B:
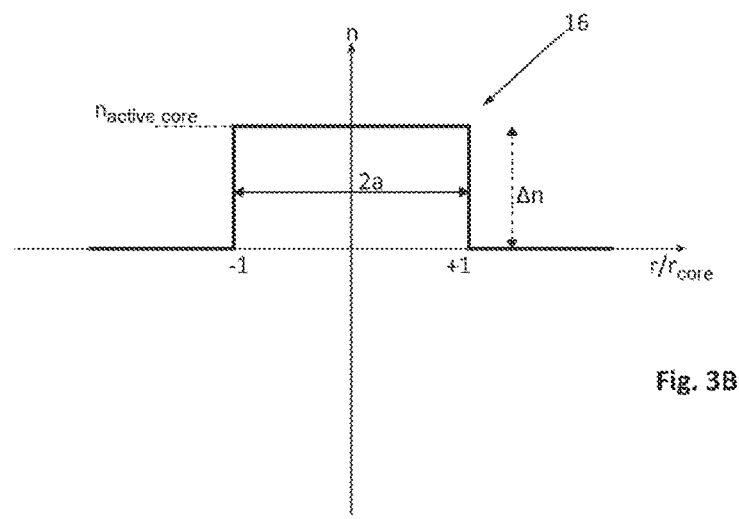
FIG. 3B is a schematic representation of an index profile of the optical fiber of FIG. 3A when the optical fiber is hot, i.e., operating at a determined power range for a single-mode emission.

When the optical fiber is placed in the active state, the profile of the negative index of the core tends toward a positive index nactivecore that is substantially constant/uniform under the thermal effect such as illustrated in FIG. 3B. The differences in index between the negative gradient index profile 15 and the constant positive index profile of the core 16 correspond to variations in refractive index produced along the entire radial direction of the optical fiber by the thermal effects generated by a range of optical power values determined and desired by the user.

Figure 1C:
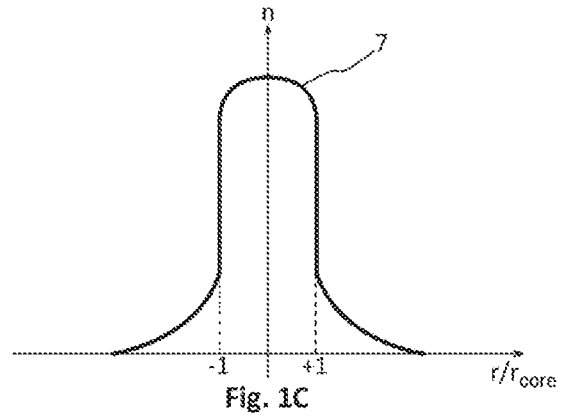
FIG. 1C is a schematic representation of a modified index profile linked to thermal effects when the optical fiber is in an active state.
Figures 2A, 2B:
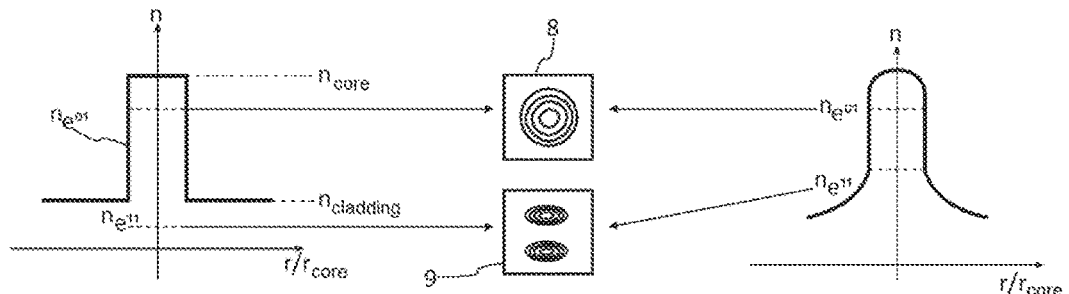
FIG. 2A is a schematic representation of the index profile of a cold optical fiber with the effective indices associated with the two first guided modes inside the core ne01, ne11 and the near-field intensity distribution as output from such an optical fiber.
FIG. 2B is a schematic representation of the index profile of a hot optical fiber with the effective indices associated with the two first guided modes inside the core and the near-field intensity distribution as output from such a fiber comprising a spatial combination of the two guided modes.

In FIG. 1C, it may be noted that a portion of the first layer of cladding that is located at the interface between the core and the first layer of cladding also exhibits a variation in index linked to thermal effects. In order to compensate for this index variation in the region of interface between the core and the cladding as well, the core and a portion of the first layer of cladding surrounding the core are configured to exhibit an index profile comprising a plurality of negative index stages that increases from the center of the optical fiber to the periphery of the first layer of cladding.

According to the invention, the region in question has a particular structure in order to be able to adjust its index profile in terms of the number of negative index stages or of the positioning of the one or more stages in the index profile.

According to a first embodiment of the invention, this region comprises an assembly of longitudinal elements, each of these longitudinal elements having a uniform refractive index, these elements being arranged so as to form a succession of concentric layers in order to define a desired index profile for the purpose of pre-compensating for index variations.

These elements are arranged adjacently so as to cover the entire area of this region in a transverse plane of the optical fiber. They each have a hexagonally shaped cross section, the sides of which make contact with those of the bordering longitudinal elements. However, any other cross-sectional shape may be suitable, in particular a circular, rectangular or triangular shape.

FIG. 4A shows a single-mode optical fiber 10 in accordance with a first embodiment of the invention. It includes, from its center to its periphery, a single-mode core 12 having a negative gradient index profile and at least one layer of cladding surrounding the core. The core 12 is formed from a plurality of longitudinal elements 11, 13A, 14A that are arranged so as to form a central portion 11 and two concentric layers 13, 14 surrounding the central portion, each of the longitudinal elements having a uniform refractive index n11, n13A, n14A. Each of the layers 11, 13, 14 is formed from identical longitudinal elements so as to have a constant refractive index n11, n13, n14.

According to a first embodiment of the invention, the index profile conferred by the three layers is a negative gradient index profile that increases from the central portion of the core to the periphery of the core. The profile includes here a first negative index stage denoted by P11 corresponding to the index of the central portion 11, a second negative index stage denoted by P13 corresponding to the index of the intermediate layer 13 and a third negative index stage denoted by P14 corresponding to the index of the layer 14. The index of the central portion n11 is lower than the index n13 of the intermediate layer, which is itself lower than the index n14 of the layer 14. This negative index gradient makes it possible to pre-compensate for variations in refractive index caused by a temperature gradient such as illustrated in FIG. 1B.

One of the advantageous features of the solution of the present invention is to be able to modulate the index profile in order to pre-compensate for variations in refractive index caused by a thermal load depending on the application.

FIG. 5A shows a single-mode optical fiber 20 akin to that of FIG. 4A. It includes a single-mode core 22 and a first layer of cladding surrounding the core. The core 22 is formed from a plurality of longitudinal elements 21, 23A, 24A that are arranged so as to form a central portion 21 and two concentric layers 23, 24 surrounding the central portion, each of the longitudinal elements having a uniform refractive index n21, n23A, n24A. Each of the layers 21, 23, 24 is formed from identical longitudinal elements so as to have a uniform refractive index n21, n23, n24.

FIG. 5B shows a variant of the index profile of FIG. 4B. The index profile 25 conferred by the three layers of FIG. 5A includes here a single buried negative index stage P24 corresponding to the layer 24.

FIG. 6A shows a single-mode optical fiber 30 akin to that of FIG. 4A. It includes a single-mode core 32 and a first layer of cladding surrounding the core. The core 32 is formed from a plurality of longitudinal elements 31, 33A, 34A that are arranged so as to form a central portion 31 and two concentric layers 33, 34 surrounding the central portion, each of the longitudinal elements having a uniform refractive index n31, n33A, n34A. Each of the layers 31, 33, 34 is formed from identical longitudinal elements so as to have a uniform refractive index n31, n33, n34.

According to FIG. 6B, the index profile 35 conferred by the three layers of FIG. 6A includes a single buried negative index stage P33 corresponding to the layer 33.

The invention has been described above with reference to FIGS. 4A, 5A and 6A for a region that is comprised entirely of longitudinal elements, but it goes without saying that this region may be only partially formed from such elements, and the rest of the region can be formed from a single longitudinal element having a single refractive index.

Similarly, even though the invention has been described above for a region forming only the core, it goes without saying that this region may also form the core and a portion of the first layer of cladding surrounding the core.

According to a second embodiment of the invention, this region comprises a succession of concentric layers, each of the concentric layers having a constant refractive index, the overall assembly defining a desired negative index profile in order to pre-compensate for index variations.

Figure 7:
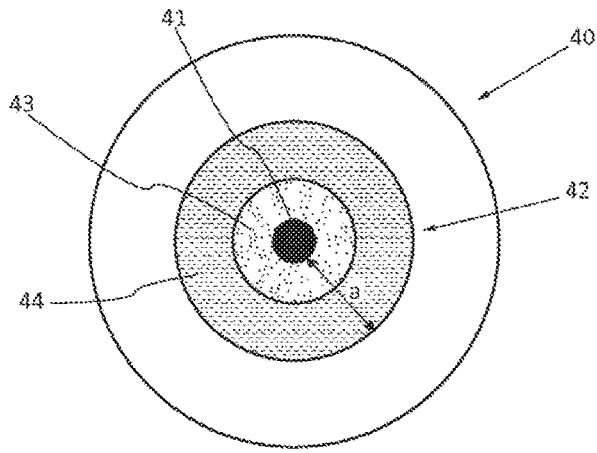
FIG. 7 is a schematic representation of an optical fiber according to a second embodiment of the invention.

An example of such an optical fiber 40 is illustrated in FIG. 7. It includes, from its center to its periphery, a single-mode core 42 and a first layer of cladding surrounding the core. The core 42 is formed from a succession of circular concentric layers 41, 43, 44, each of the layers consisting of a single longitudinal element having a ring-shaped cross section. Each of the layers has a constant refractive index, the overall assembly defining a desired negative index profile in order to pre-compensate for variations in refractive index caused by a thermal load. This negative index profile is for example a negative gradient index profile that increases from the center of the core to the periphery of the core such as illustrated in FIG. 4B. It may also include a single negative index stage such as illustrated in FIGS. 5B and 5C or a plurality of negative index stages.

Figure 8:
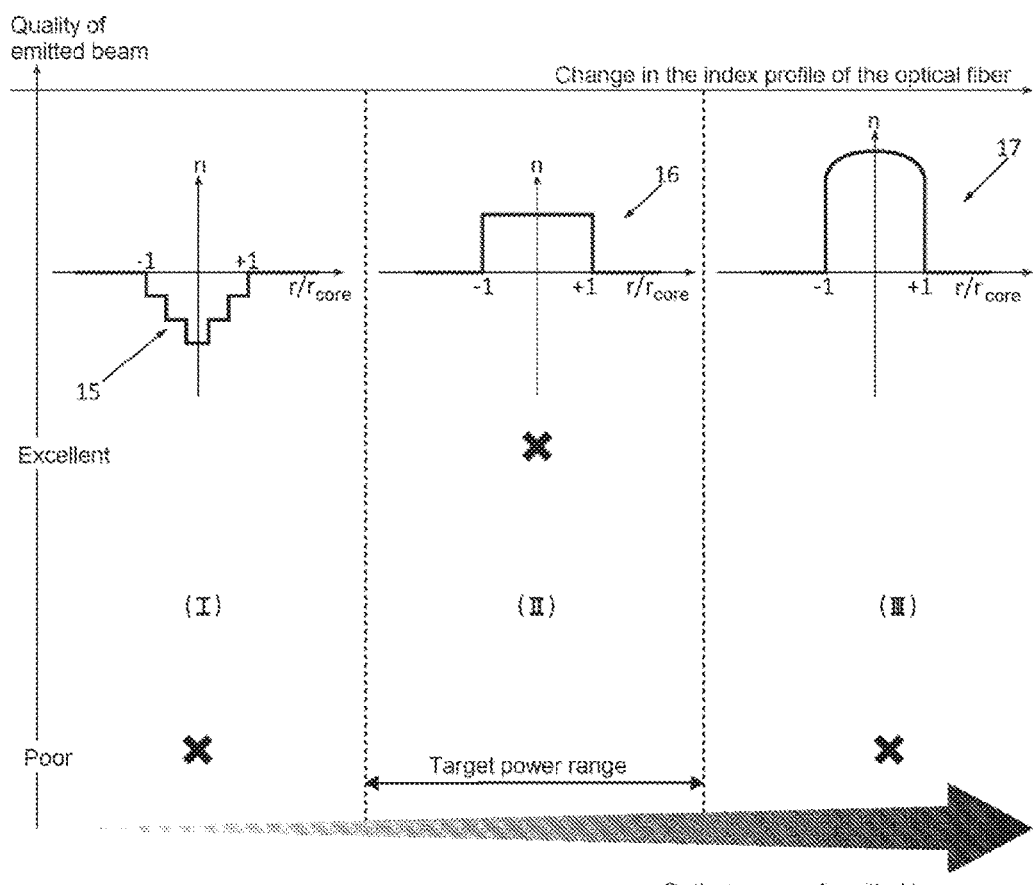
FIG. 8 illustrates the various phases in the progression of the index profile of an optical fiber with a negative gradient index according to the invention as a function of optical power.

FIG. 8 shows the progression in the index profile of the core of the optical fiber as a function of the optical power of the beam emitted from the core. In this example, the variation in refractive index of the cladding, which is considered to be very low with respect to the variation in the core, is not shown in FIG. 8. Three zones are distinguished. In a first zone (I), the core has a negative gradient index profile when the optical fiber is in an inactive state, corresponding to an optical power range having a value of zero or a very low value. When referring to a very low optical power, what is meant is an optical power that does not generate thermal effects sufficient to negatively affect the refractive index. In a second zone (II), when the optical fiber is in an active state, corresponding to a desired optical power range for which the variations in refractive index between the optical fiber in an inactive state and the optical fiber in an active state have been determined, the index of the core is uniform over the entire area of the core and the index profile comprises a positive index stage. The quality of the emitted beam is excellent. In a third zone (III), when the optical fiber operates at a range of optical powers that are higher than the range of desired optical powers, the negative gradient index profile is no longer sufficient to compensate for the index variations due to thermal effects. The optical fiber then becomes multimode.

The present invention therefore allows the active optical fiber to operate well in a power range desired by the user.

In a known manner, the overall refractive index of the core 12, 22, 32, 42 must be determined such that the difference Δn between the refractive index of the core when the optical fiber is in an active state and that of the first layer of cladding surrounding the core is as small as possible, for example of the order of 1×10−4, making it possible to emit a single-mode light beam at a given wavelength.

Furthermore, depending on the condition on the radius of the core a and on the difference in index Δn, the diameter 2a of the core is determined so as to allow light to be confined within the core. The diameter 2a of the core is typically between 35 and 200 μm.

Regardless of the embodiment of the invention, the core of the fiber comprises at least two zones, a first zone with at least a first refractive index and a second zone with at least a second refractive index that is different from the first refractive index, the difference between the first refractive index and the second refractive index being of the same order of magnitude as the variation in the second refractive index between the inactive state and the active state of the fiber.

By "the same order of magnitude," what is meant is that the difference between the first refractive index and the second refractive index is between 0.1 and 10 times the variation in the second refractive index between the active state and the inactive state of the fiber.

The term "zone of the core" is understood to mean a portion of the cross section of the core. Each zone may have a refractive index that is constant over the entire zone or comprise at least two sectors, each sector having a constant refractive index, the sectors having different refractive indices.

Figure 9:
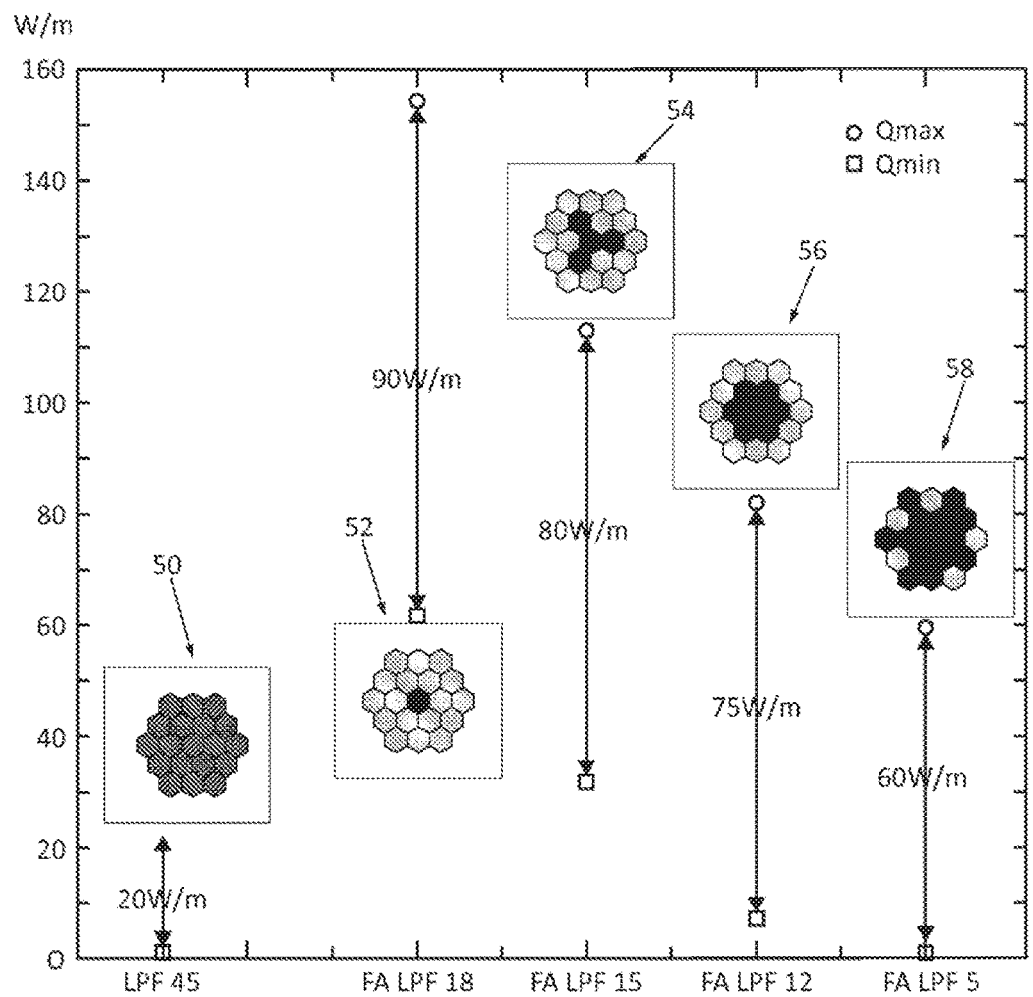
FIG. 9 illustrates a cross section of a fiber according to the prior art and cross sections of optical fibers according to the invention and assigns single-mode operating ranges to each one thereof.

In FIG. 9, 50 shows the core of a fiber according to the prior art that comprises a refractive index that is constant/uniform over the entire cross section of the core when the fiber is inactive, and cores of fibers 52, 54, 56, 58 in accordance with the invention. Each fiber is associated with an optical power range delimited by an upper threshold Qmax and a lower threshold Qmin, in which the single-mode optical fiber operates in single-mode regime.

For a given core diameter, the single-mode optical fiber 50 of the prior art operates within a range spanning of the order of 0 to 20 W/m.

It is observed that for the same core diameter, the single-mode optical fibers 52, 54, 56, 58 in accordance with the invention operate in ranges with an upper threshold Qmax that is higher than or equal to 60 W/m. For the single-mode optical fiber 52, the upper threshold Qmax reaches 160 W/m.

Furthermore, the invention makes it possible to increase the operating range that is higher than or equal to 60 W/m while the operating range of the single-mode optical fiber 50 of the prior art is limited to 20 W/m.

The core of the single-mode optical fibers 52, 54, 56 and 58 comprises at least two zones 60, a first zone 60 with a first index and at least one second zone 62 with a second refractive index that is lower than the first refractive index.

To give an order of magnitude, the cladding has a refractive index of 1.457. For the core, the first refractive index is equal to nc (of the order of 1.457) and the second refractive index is equal to nc−1×10−4.

For the single-mode optical fibers 52, 54 and 56, the second zone 62 extends around the entire periphery of the core and separates the first zone 60 from the cladding. These configurations make it possible to obtain operating ranges with high upper thresholds Qmax. However, the lower threshold Qmin of these operating ranges is higher than 0, inasmuch as these single-mode optical fibers operate in single-mode regime only from a certain power level upwards.

For the single-mode optical fibers 52, 54, the single-mode core comprises a ratio between the area of the cross section of the first zone and the area of the cross section of the second zone that is smaller than 1. In the case of the optical fiber 56, the single-mode core comprises a ratio between the area of the cross section of the first zone and the area of the cross section of the second zone that is greater than 1. Thus, the greater this ratio, the closer the lower threshold Qmin is to 0. Thus, in the case of the single-mode optical fiber 56, the lower threshold Qmin is of the order of 5 W/m. However, the greater this ratio, the lower the upper threshold Qmax.

According to another embodiment illustrated by the single-mode optical fiber 58, the single-mode core comprises multiple disjunct second zones 62. Preferably, these disjunct second zones are positioned adjacent to the cladding. In this case, the single-mode core comprises a ratio between the area of the cross section of the first zone and the area of the cross section of the second zone that is greater than 2.

Advantageously, the disjunct second zones 62 are arranged asymmetrically.

It is observed that for the single-mode optical fiber 58, the lower threshold Qmin is equal to 0.

According to one embodiment of the invention, the method for manufacturing an optical fiber 10, 20, 30 in accordance with the first embodiment and a single-mode optical fiber 40 in accordance with the second embodiment comprises the following steps:
- a powder is distributed into preforms corresponding to longitudinal elements or bars, respectively, of the single-mode core;
- the preforms are vitrified;
- the dimensions of the preforms are adapted by means of fiberization in order to form the bars;
- the bars are arranged in a staggered configuration so as to form the single-mode core;
- the space between the longitudinal elements is evacuated.

Reference may be made to patent FR2 974 637 for further details on this method.

Other manufacturing methods could be implemented for the purpose of producing and assembling the longitudinal elements, such as modified chemical vapor phase deposition (MCVD). «modified chemical vapor phase deposition»).

According to the invention, the single-mode core is composed of an assembly of bars comprising at least a first type of bar with a first refractive index and at least a second type of bar with a second refractive index that is different from the first refractive index, the difference between the first refractive index and the second refractive index being of the same order of magnitude as the variation in refractive index of the second zone between the inactive state and the active state of the optical fiber.

According to certain embodiments, the second refractive index is lower than the first refractive index.

According to certain embodiments, the bars of the second type are positioned around the entire perimeter of the single-mode core so as to obtain a second zone that is continuous around the entire perimeter of the single-mode core.

According to certain embodiments, the bars of the second type are disjunct and preferably positioned asymmetrically.

According to certain embodiments, the bars of the second type are positioned adjacent to the cladding.

According to certain embodiments, the ratio between the number of bars of the first type and the number of bars of the second type is greater than 1, and preferably greater than 2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A single-mode optical fiber comprising, from a center to a periphery:
   a single-mode core;
   at least one layer of cladding surrounding said core having at least one cladding refractive index,
   the optical fiber being configured to occupy an inactive state in which the optical fiber is not subject to a thermal load and an active state in which the optical fiber is subject to a thermal load,
   the single-mode core comprising at least two zones, a first zone with at least a first refractive index and a second zone with at least a second refractive index that is different from the first refractive index, wherein the first refractive index is lower than or equal to the at least one cladding refractive index in the inactive state of the optical fiber,
   the difference between the first refractive index and the second refractive index being of a same order of magnitude as a variation in the second refractive index of the second zone caused by a thermal effect between the inactive state and the active state of the fiber,
   wherein the single-mode core comprises multiple disjunct second zones, and
   wherein the disjunct second zones are distributed asymmetrically.

2. The single-mode optical fiber as claimed in claim 1, wherein the difference between the first refractive index and the second refractive index is smaller than 1×10−3 in the inactive state of the optical fiber.

3. The single-mode optical fiber as claimed in claim 1, wherein the second refractive index is lower than the first refractive index.

4. The single-mode optical fiber as claimed in claim 1, wherein the one or more second zones are adjacent to the cladding.

5. The single-mode optical fiber as claimed in claim 4, wherein the difference Δn between the refractive index of the one or more second zones of the single-mode core when the optical fiber is in an active state and the refractive index of the cladding surrounding the core is of the order of 1×10−4.

6. The single-mode optical fiber as claimed in claim 1, wherein the single-mode core comprises a ratio between the area of the cross section of the first zone and the area of the cross section of the second zone that is greater than 1.

7. The single-mode optical fiber as claimed in claim 1, wherein the first zone comprises multiple sectors with different refractive indices that are different from the second refractive index of the second zone, the sectors of the first zone each having a constant refractive index and being arranged concentrically, their refractive indices increasing from the center toward the periphery of the single-mode core.

8. The single-mode optical fiber as claimed in claim 1, wherein the diameter of the core is between 35 μm and 200 μm.

9. A high-power optical fiber laser comprising a single-mode optical fiber as claimed in claim 1 in the capacity of an optical amplification medium for the purpose of generating a single-mode high-power laser beam.

10. A method for manufacturing a single-mode optical fiber as claimed in claim 1, comprising the step:
constructing at least the single-mode core of the fiber by assembling longitudinal bars in a staggered configuration, the assembly of bars comprising at least a first type of bar with a first refractive index and at least a second type of bar with a second refractive index that is different from the first refractive index, the difference between the first refractive index and the second refractive index being of the same order of magnitude as the variation in refractive index of the second zone between the inactive state and the active state of the optical fiber,
wherein the bars of the second type are disjunct, and
wherein the bars of the second type are positioned asymmetrically.

11. The manufacturing method as claimed in claim 10, wherein the bars of the second type are positioned adjacent to the cladding.

12. The manufacturing method as claimed claim 11, wherein the difference between the refractive index of the bars of the second type when the optical fiber is in an active state and the refractive index of the cladding surrounding the core is of the order of $1\times10^{-4}$.

13. The manufacturing method as claimed in claim 10, wherein the second refractive index is lower than the first refractive index.

14. The manufacturing method as claimed in claim 13, wherein the ratio between the number of bars of the first type and the number of bars of the second type is greater than 1.

* * * * *